(12) United States Patent
Suzuki et al.

(10) Patent No.: US 11,217,361 B2
(45) Date of Patent: Jan. 4, 2022

(54) ELECTRICAL WIRE, COAXIAL ELECTRICAL WIRE, CABLE, AND METHOD FOR MANUFACTURING ELECTRICAL WIRE

(71) Applicant: Hitachi Metals, Ltd., Tokyo (JP)

(72) Inventors: Hideyuki Suzuki, Tokyo (JP); Takuya Oriuchi, Tokyo (JP); Katsuya Iikai, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/678,892

(22) Filed: Nov. 8, 2019

(65) Prior Publication Data

US 2020/0161018 A1    May 21, 2020

(30) Foreign Application Priority Data

Nov. 20, 2018    (JP) .............................. JP2018-217380

(51) Int. Cl.

| H01B 3/44 | (2006.01) |
|---|---|
| C08K 5/14 | (2006.01) |
| C08K 5/56 | (2006.01) |
| C08L 23/06 | (2006.01) |
| H01B 11/18 | (2006.01) |
| H01B 13/016 | (2006.01) |

(Continued)

(52) U.S. Cl.
CPC ................. *H01B 3/44* (2013.01); *C08K 5/14* (2013.01); *C08K 5/56* (2013.01); *C08L 23/06* (2013.01); *H01B 7/0216* (2013.01); *H01B 11/18* (2013.01); *H01B 13/016* (2013.01); *H01B 13/14* (2013.01); *C08J 2323/06* (2013.01)

(58) Field of Classification Search
CPC ... H01B 3/44; H01B 7/02; H01B 7/04; H01B 7/06; H01B 7/08; H01B 13/016; H01B 11/02; H01B 11/04; H01B 11/18; H01B 13/14
USPC ............. 174/110 R–110 PM, 120 R, 120 SR, 174/121 R, 121 SR
See application file for complete search history.

(56) References Cited

U.S. PATENT DOCUMENTS

| 7,737,242 B2 * | 6/2010 | Ziche ..................... C08G 18/61 528/28 |
|---|---|---|
| 2003/0212180 A1 * | 11/2003 | Rietz ..................... H01B 3/443 524/436 |

(Continued)

FOREIGN PATENT DOCUMENTS

| FR | 1340788 A2 * | 9/2003 | ............... H01B 7/02 |
|---|---|---|---|
| JP | 05298935 A * | 11/1993 | ............... H01B 3/44 |

(Continued)

*Primary Examiner* — William H. Mayo, III
(74) *Attorney, Agent, or Firm* — McGinn I.P. Law Group, PLLC.

(57) ABSTRACT

An electrical wire includes a metal conductor and an insulation layer. A wire diameter of the metal conductor is 0.20 mm or smaller. The insulation layer covers the metal conductor. The insulation layer includes an ultraviolet-crosslinkable resin composition containing 80% by mass or more of a thermoplastic resin. The ultraviolet-crosslinkable resin composition desirably contains, relative to 100 parts by mass of the thermoplastic resin, 0.5 parts by mass or more and 5 parts by mass or less of a photoradical generator, and 1 part by mass or more and 15 parts by mass or less of a reactive monomer.

19 Claims, 5 Drawing Sheets

(51) Int. Cl.
*H01B 7/02* (2006.01)
*H01B 13/14* (2006.01)

(56) References Cited

U.S. PATENT DOCUMENTS

| | | | |
|---|---|---|---|
| 2004/0151446 A1* | 8/2004 | Wyatt, II | H01B 11/1878 |
| | | | 385/100 |
| 2008/0045619 A1* | 2/2008 | Jackson | C08L 23/04 |
| | | | 522/32 |
| 2011/0180298 A1* | 7/2011 | Kato | H01B 3/447 |
| | | | 174/102 R |
| 2012/0090865 A1* | 4/2012 | Kato | H01B 3/56 |
| | | | 174/34 |
| 2016/0083540 A1* | 3/2016 | Makal | C08L 23/06 |
| | | | 428/36.9 |
| 2017/0183441 A1* | 6/2017 | Makal | C08G 18/3206 |

FOREIGN PATENT DOCUMENTS

| | | | | |
|---|---|---|---|---|
| JP | 0757550 A | * | 3/1995 | H01B 3/44 |
| JP | 2002-133962 A | | 5/2002 | |

* cited by examiner

ELECTRICAL WIRE, COAXIAL ELECTRICAL WIRE, CABLE, AND METHOD FOR MANUFACTURING ELECTRICAL WIRE

CROSS-REFERENCE TO RELATED APPLICATIONS

The present application claims the benefit of Japanese Patent Application No. 2018-217380 filed on Nov. 20, 2018 with the Japan Patent Office, and entire disclosure of which is incorporated herein by reference.

BACKGROUND

The present disclosure relates to an electrical wire, a coaxial electrical wire, a cable, and a method for manufacturing an electrical wire.

In instruments where a number of sensors are operated in locations with limited space (such as industrial robots, precision equipment for medical use, and so on), thin electrical wires, cables, and the like with small diameters (which are called ultra-thin wires) are used.

The ultra-thin wires are densely arranged in locations with extremely narrow space and may be required to have mechanical strength under high temperature. To improve the mechanical strength under high temperature, a method for crosslinking insulation layers of the ultra-thin wires is used. One technique to crosslink the insulation layers is disclosed, for example, in Japanese Unexamined Patent Application Publication No. 2002-133962 (Patent Document 1).

SUMMARY

The production of ultra-thin wires in which insulation layers are crosslinked has been difficult. The reasons for this difficulty are now described. The insulation layers are formed by extrusion coating by an extruder. Known as methods for crosslinking the insulation layers are organic peroxide crosslinking, silane-water crosslinking, and electron beam crosslinking.

In the case of the organic peroxide crosslinking and silane-water crosslinking, premature crosslinking of a resin composition often occurs in the extruder. Premature crosslinking increases the viscosity of the resin composition, which in turn increases a tension force applied to metal conductors of the ultra-thin wires during extrusion coating. The increase in the tension force breaks the metal conductors because the wire diameters of the metal conductors of the ultra-thin wires are small.

In the case of the electron beam crosslinking, a large electron beam irradiation device is used for crosslinking. The tension force to be applied to the metal conductors in the large electron beam irradiation device is large. If applied to the metal conductors, the large tension force causes breaking of the metal conductors since the wire diameters of the metal conductors of the ultra-thin wires are small.

It is desirable that one aspect of the present disclosure provides an electrical wire, a coaxial electrical wire, and a cable each comprising a metal conductor with a small wire diameter and a crosslinked insulation layer, and can be easily manufactured, in comparison to conventional manufacturing. It is desirable that one aspect of the present disclosure also provides a method for manufacturing such electrical wire, coaxial electrical wire, and cable.

One aspect of the present disclosure provides an electrical wire comprising a metal conductor with a wire diameter of 0.20 mm or smaller and an insulation layer covering the metal conductor. The insulation layer comprises an ultraviolet (UV)-crosslinkable resin composition containing 80% by mass or more of a thermoplastic resin.

The insulation layer of the electrical wire according to one aspect of the present disclosure comprises the UV-crosslinkable resin composition containing 80% by mass or more of a thermoplastic resin. The UV-crosslinkable resin composition is rarely prematurely crosslinked in an extruder. Accordingly, the tension force to be applied to the metal conductor in extrusion coating is unlikely to increase, which in turn reduces the possibility of breaking of the metal conductor in the extrusion coating, even if the wire diameter of the metal conductor is small. The electrical wire according to one aspect of the present disclosure is, therefore, easily manufactured, in comparison to conventional manufacturing.

Moreover, the UV-crosslinkable resin composition does not require the large electron beam crosslinking device in the process of crosslinking. Thus, the tension force to be applied to the metal conductor in the crosslinking process is unlikely to increase, which in turn reduces the possibility of breaking of the metal conductor in the crosslinking process, even if the wire diameter of the metal conductor is small. Thus, the electrical wire according to one aspect of the present disclosure is easily manufactured, in comparison to conventional manufacturing.

BRIEF DESCRIPTION OF THE DRAWINGS

Some embodiments of the present disclosure will be described hereinafter by way of example with reference to the accompanying drawings, in which.

DETAILED DESCRIPTION OF EXEMPLARY EMBODIMENTS

1. Structure of Electrical Wire (1-1) Metal Conductor

An electrical wire according to the present disclosure comprises a metal conductor. The type of the metal conductor is not limited to a specific type. The metal conductor may be covered with some kind of coating. A wire diameter of the metal conductor is 0.20 mm or smaller, preferably 0.13 mm or smaller, more preferably 0.06 mm or smaller, and particularly preferably 0.04 mm or smaller. A smaller wire diameter makes the diameter of the electrical wire smaller, which makes it easy to dispose the electrical wire in locations with narrow space.

If the wire diameter is 0.20 mm or smaller, it has been difficult to perform extrusion by a conventional method for manufacturing electrical wires in which organic peroxide crosslinking or silane-water crosslinking is employed. Moreover, if the wire diameter is 0.20 mm or smaller, a risk of breaking of wires has been high in a conventional method for manufacturing electrical wires in which electron beam crosslinking is employed.

(1-2) Insulation Layer

The electrical wire according to the present disclosure is provided with an insulation layer. The insulation layer covers the metal conductor. The insulation layer comprises an ultraviolet (UV)-crosslinkable resin composition that contains 80% by mass or more of a thermoplastic resin. In other words, the thermoplastic resin makes up 80 parts by mass or more of 100 parts by mass of the UV-crosslinkable resin composition. The thermoplastic resin means a type of resin whose plasticity is exhibited by heat. The thermoplastic resin does not usually have crosslinkability or reactivity.

Examples of the thermoplastic resin include polyethylene, polypropylene, polyvinyl chloride, polystyrene, polyvinyl acetate, polyurethane, polyamide (nylon), polycarbonate, polyester, and cyclic polyolefin.

Examples of the polyethylene include high-density polyethylene, linear low-density polyethylene, low-density polyethylene, and ultralow density polyethylene. Examples of the polyester include polyethylene terephthalate, and polybutylene terephthalate.

Examples of the thermoplastic resin further include resins based on the aforementioned thermoplastic resin. Specifically, the examples include ethylene-butene-1 copolymer, ethylene-hexene-1 copolymer, ethylene-octene-1 copolymer, ethylene-vinyl acetate copolymer, ethylene-ethyl acrylate copolymer, polybutene, poly-4-methyl-pentene-1, ethylene-butene-hexene ternary copolymer, ethylene-methyl methacrylate copolymer, ethylene-methyl acrylate copolymer, ethylene-glycidyl methacrylate copolymer, polyolefin elastomer into which rubber based molecules are introduced, olefin block copolymer, and polyester elastomer.

The UV-crosslinkable resin composition further contains, for example, a photoradical generator. The photoradical generator acts to initiate crosslinking reaction. The photoradical generator generates radicals by irradiation of UV rays. The generated radicals graft the thermoplastic resin and a reactive monomer, and induce the crosslinking reaction between the grafted monomers.

An addition amount of the photoradical generator can be determined in accordance with the properties of the UV-crosslinkable resin composition. The addition amount of the photoradical generator is preferably 0.5 parts by mass or more and 10 parts by mass or less relative to 100 parts by mass of the thermoplastic resin, and more preferably 0.5 parts by mass or more and 5 parts by mass or less.

If the addition amount of the photoradical generator is 0.5 parts by mass or more relative to 100 parts by mass of the thermoplastic resin, the crosslinkability of the UV-crosslinkable resin composition increases. If the addition amount of the photoradical generator is 10 parts by mass or less relative to 100 parts by mass of the thermoplastic resin, elongation of the UV-crosslinkable resin composition increases. Thus, the UV-crosslinkable resin composition is unlikely to be fragile. If the addition amount of the photoradical generator is 6 parts by mass or less relative to 100 parts by mass of the thermoplastic resin, the elongation of the UV-crosslinkable resin composition further increases.

Examples of the photoradical generator include acetophenone, 4,4'-dimethoxybenzyl, diphenylethanedione, 2-hydroxy-2-phenylacetophenone, diphenyl ketone, benzophenone-2-carboxylic acid, 4,4'-bis(diethylamino)benzophenone, 4,4'-bis(dimethylamino)benzophenone, benzoin methyl ether, benzoin iso-propyl ether, benzoin isobutyl ether, benzoin ethyl ether, 4-benzoylbenzoic acid, 2,2'-bis(2-chlorophenyl)-4,4',5,5'-tetraphenyl-1,2'-biimidazole, 2-methyl benzoylbenzoate, 2-(1,3-benzodioxole-5-yl)-4,6-bis(trichloromethyl)-1,3,5-triazine, 2-benzil-2-(dimethylamino)-4'-morpholino butyrophenone, 2,3-bornandion, 2-chlorothioxanthone, 4,4'-dichlorobenzophenone, 2,2-diethoxyacetophenone, 2,2-dimethoxy-2-phenylacetophenone, 2,4-diethyl thioxanthene-9-one, diphenyl(2,4,6-trimethylbenzoyl)phosphine oxide, 1,4-dibenzoyl benzene, 2-ethyl anthraquinone, 1-hydroxycyclohexyl phenyl ketone, 2-hydroxy-2-methylpropiophenone, 2-hydroxy-4'-(2-hydroxyethoxy)-2-methylpropiophenone, phenyl(2,4,6-trimethylbenzoyl)lithium phosphinate, 2-methyl-4'-(methylthio)-2-morpholino propiophenone, 2-isonitrosopropiophenone, 2-phenyl-2-(p-toluenesulfonyloxy)acetophenone, and phenylbis(2,4,6-trimethylbenzoyl)phosphine oxide. One of the aforementioned compounds may be used alone, or two or more thereof may be used in combination as the photoradical generator.

The UV-crosslinkable resin composition further contains, for example, the reactive monomer. The reactive monomer acts as a crosslinking aid. The reactive monomer has a functional group that causes a crosslinking reaction or a polymerization reaction by, for example, radicals or cations. Examples of the functional group that causes the crosslinking reaction or the polymerization reaction by radicals or cations include an acrylic group, a methacrylic group, a vinyl group, a vinyl ether group, an oxetane group, an epoxy group, an alicyclic epoxy group, an amino group, an allyl group, a maleic acid, and a maleic anhydride. The reactive monomer may be a monofunctional monomer or polyfunctional monomer. One type of monomer may be used alone, or two or more types of monomers may be used in combination as the reactive monomer.

An addition amount of the reactive monomer can be determined in accordance with the properties of the UV-crosslinkable resin composition. The addition amount of the reactive monomer is preferably 1 part by mass or more and 30 parts by mass or less relative to 100 parts by mass of the thermoplastic resin, and more preferably 1 part by mass or more and 15 parts by mass or less.

If the addition amount of the reactive monomer is 1 part by mass or more relative to 100 parts by mass of the thermoplastic resin, the crosslinkability of the UV-crosslinkable resin composition increases. If the addition amount of the reactive monomer is 30 parts by mass or less relative to 100 parts by mass of the thermoplastic resin, the elongation of the UV-crosslinkable resin composition increases. Thus, the UV-crosslinkable resin composition is less likely to be fragile. If the addition amount of the reactive monomer is 15 parts by mass or less relative to 100 parts by mass of the thermoplastic resin, the elongation of the UV-crosslinkable resin composition further increases.

The UV-crosslinkable resin composition may further contain an additive such as an UV absorber and a light stabilizer. The additive provides the UV-crosslinkable resin composition with functionality. The UV absorber only needs to be fitted to the intended use and thus is not limited to a specific type. Examples of the UV absorber include a salicylate derivative, a benzophenone-based UV absorber, a benzotriazole-based UV absorber, an oxalic anilide derivative, 2-ethyl-hexyl-2-cyano-3,3-diphenyl acrylate. Examples of the salicylate derivative include phenyl salicylate, and p-tert-butyl phenyl salicylate.

Examples of the benzophenone-based UV absorber include 2,4-dihydroxybenzophenone, 2-hydroxy-4-methoxybenzophenone, 2,2'-dihydroxy-4-methoxybenzophenone, 2,2'dihydroxy-4,4'-dimethoxybenzophenone, 2-hydroxy-4-n-octoxybenzophenone, 2,2',4,4'-tetrahydroxy benzophenone, 4-dodecyloxy-2-hydroxybenzophenone, 3,5-di-tert-butyl-4-hydroxybenzoyl acid, n-hexadecyl ester, bis(5-benzoyl-4-hydroxy-2-methoxyphenyl)methane, 1,4-bis(4-benzoyl-3-hydroxyphenoxy)butane, and 1,6-bis(4-benzoyl-3-hydroxyphenoxy)hexane.

Examples of the benzotriazole-based UV absorber include 2-(2'-hydroxy-5'-methyl-phenyl)benzotriazole, 2-(2'-hydroxy-3',5'-di-tert-butyl-phenyl)benzotriazole, 2-(2'-hydroxy-3'-di-tert-butyl-5'-methyl-phenyl)-5-chlorobenzotriazole, 2-(2'-hydroxy-3',5'-di-tert-butyl-phenyl)-5-chlorobenzotriazole, 2-(2'-hydroxy-5'-tert-octylphenyl)benzotriazole, 2-(2'-hydroxy-3',5'-di-tert-amylphenyl)benzotriazole, 2,2'-methylenebis [4-(1,1,3,3-tetramethylbutyl)-6-(2H-benzotriazole-2-yl)phenol], 2-[2-hydroxy-3,5-bis($\alpha,\alpha$-dimethylbenzyl)phenyl]-2H-benzotriazole, and other benzotriazole derivatives. One of the aforementioned compounds may be used alone, or two or more thereof may be used in combination as the UV absorber.

The light stabilizer is not limited to a specific type. Examples of the light stabilizer include a hindered amine-based light stabilizer. Examples of the hindered amine-based light stabilizer include poly[[6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)imino]], poly[(6-morpholino-s-triazine-2,4-diyl)[2,2,6,6-tetramethyl-4-piperidyl]imino]-hexamethylene[(2,2,6,6-tetramethyl-4-piperidyl)imino]], N,N'-bis(3-aminopropyl) ethylene diamine.2,4-bis[N-butyl-N-(1,2,2,6,6-pentamethyl-4-piperidyl)amino]-6-chloro-1,3,5-triazine condensate, and dibutyl amine.1,3,5-triazine. N,N'-bis(2,2,6,6-tetramethyl-4-piperidyl-1,6-hexamethylenediamine. N-(2,2,6,6-tetramethyl-4-piperidyl)butylamine polycondenstate. One of the aforementioned compounds may be used alone, or two or more thereof may be used in combination as the light stabilizer.

The UV-crosslinkable resin composition may further contain, for example, an additive such as a process oil, a processing aid, a flame retardant aid, an antioxidant, a lubricant, an inorganic filler, a compatibilizer, a stabilizer, and a coloring agent, if necessary.

Figure 1:
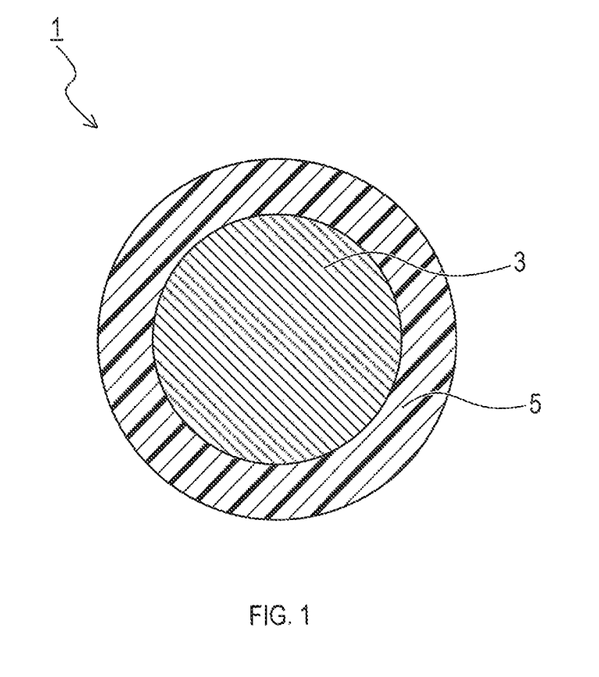
FIG. 1 is a sectional view showing a structure of an electrical wire.

The electrical wire according to the present disclosure has a structure shown in FIG. 1, for example. An electrical wire 1 comprises a metal conductor 3 and an insulation layer 5. The metal conductor 3 is covered with the insulation layer 5. The insulation layer 5 is composed of the UV-crosslinkable resin composition containing 80% by mass or more of the thermoplastic resin. The insulation layer 5 is UV crosslinked.

2. Structure of Coaxial Electrical Wire

The coaxial electrical wire according to the present disclosure comprises a metal conductor, an insulation layer, external conductors, and a sheath layer. The metal conductor 3 and the insulation layer 5 described in the section "1. Structure of Electrical Wire" are used as the metal conductor and the insulation layer of the coaxial electrical wire.

The external conductors are disposed on the outer circumference side of the insulation layer. The external conductors are in contact with, for example, the outer peripheral surface of the insulation layer. Other layer(s) may be interposed between the outer peripheral surface of the insulation layer and the external conductors. The external conductors are only required to have conductivity, and thus the composition thereof is not limited to a specific composition. The thicknesses of the external conductors are preferably 0.01 mm or more and 0.2 mm or less. If the external conductors are made of a metal wire material, the thicknesses of the external conductors mean the diameter of the metal wire material.

The sheath layer is provided on the outer circumference side of the external conductors. The sheath layer is in contact with, for example, the outer peripheral surface of the external conductors. Other layer(s) may be interposed between the sheath layer and the external conductors. The sheath layer is composed of, for example, those listed hereinabove as the examples of the thermoplastic resin contained in the insulation layer of the electrical wire. The thickness of the sheath layer is preferably 0.1 mm or more and 2.0 mm or less.

Figure 2:
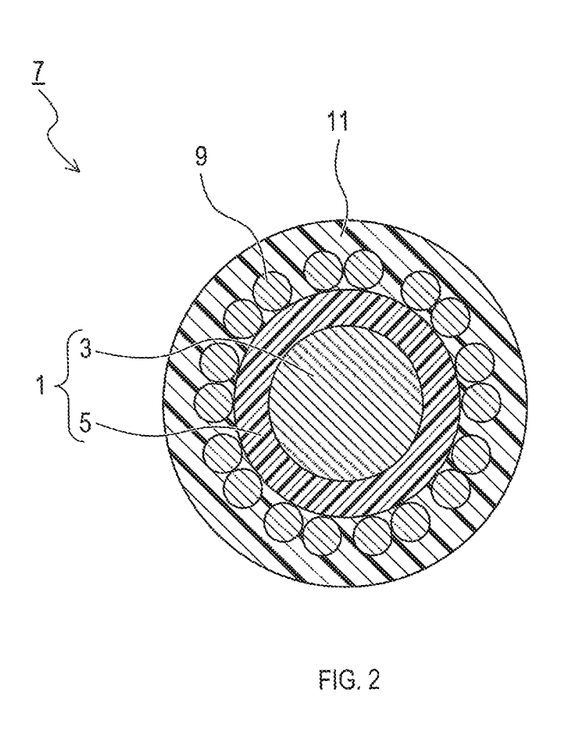
FIG. 2 is a sectional view showing a structure of a coaxial electrical wire.

The coaxial electrical wire according to the present disclosure has a structure shown in FIG. 2, for example. A coaxial electrical wire 7 comprises the electrical wire 1, external conductors 9, and a sheath layer 11. The electrical wire 1 is identical to the one shown in FIG. 1. The electrical wire 1 comprises the metal conductor 3 and the insulation layer 5. The external conductors 9 are provided on the outer circumference side of the insulation layer 5. The sheath layer 11 is provided on the outer circumference side of the external conductors 9. Specifically, the sheath layer 11 substantially encapsulates the external conductors 9.

3. Structure of Cable

A cable according to the present disclosure comprises: (a) at least one electrical wire and/or (b) at least one coaxial electrical wire; and a sheath.

The electrical wire described in the section "1. Structure of Electrical Wire" is used as the electrical wire of the aforementioned (a). The coaxial electrical wire described in the section "2. Structure of Coaxial Electrical Wire" is used as the coaxial electrical wire in the aforementioned (b).

The sheath binds the at least one electrical wire and/or the at least one coaxial electrical wire. The sheath is composed of, for example, those listed hereinabove as the examples of the thermoplastic resin included in the insulation layer of the electrical wire. The thickness of the sheath is preferably 0.1 mm or more and 2.0 mm or less.

The sheath contains, for example, a thermoplastic resin, a flame retardant, and an additive. Examples of the thermoplastic resin include those listed hereinabove as the examples of the thermoplastic resin contained in the insulation layer of the electrical wire. Examples of the flame retardant include metallic hydroxide. Examples of the metallic hydroxide include magnesium hydroxide, aluminum hydroxide, and calcium hydroxide. Among the metallic hydroxides, magnesium hydroxide is desirable due to its high flame resistance. It is desirable, from the perspective of dispersibility, that the surface of the metallic hydroxide is treated.

Examples of a surface treating agent that can be used for treating the surface of the metallic hydroxide may include a silane-based coupling agent, a titanate coupling agent, a fatty acid, and a fatty acid metal salt. Among these surface treating agents, the silane-based coupling agent is desirable from the perspective of enhancing adhesiveness between the resin and the metallic hydroxide.

Examples of the silane-based coupling agent that can be used include: a vinylsilane compound such as vinyltrimethoxysilane, vinyl triethoxysilane, and vinyltris($\beta$-methoxyethoxy)silane; an amino silane compound such as $\gamma$-aminopropyltrimethoxysilane, $\gamma$-aminopropyltriethoxysilane, N-$\beta$-(aminoethyl)$\gamma$-aminopropyltrimethoxysilane, $\beta$--(aminoethyl) $\gamma$-aminopropylmethyldimethoxysilane, and N-phenyl-γ-aminopropyltrimethoxysilane; an epoxysilane compound such as β-(3, 4 epoxy cyclohexyl)ethyltrimethoxysilane, γ-glycidoxypropyltrimethoxysilane, and γ-glycidoxypropylmethyldiethoxysilane; an acrylic silane compound such as γ-methacryloxypropyl trimethoxy silane; a polysulfide silane compound such as bis(3-(triethoxysilyl)propyl)disulfide and bis(3-(triethoxysilyl)propyl)tetrasulfide; and a mercaptosilane compound such as 3-mercaptopropyltrimethoxysilane and 3-mercaptopropyltriethoxysilane. Examples of the additive include those listed hereinabove as examples of the additive contained in the insulation layer of the electrical wire.

Figure 3:
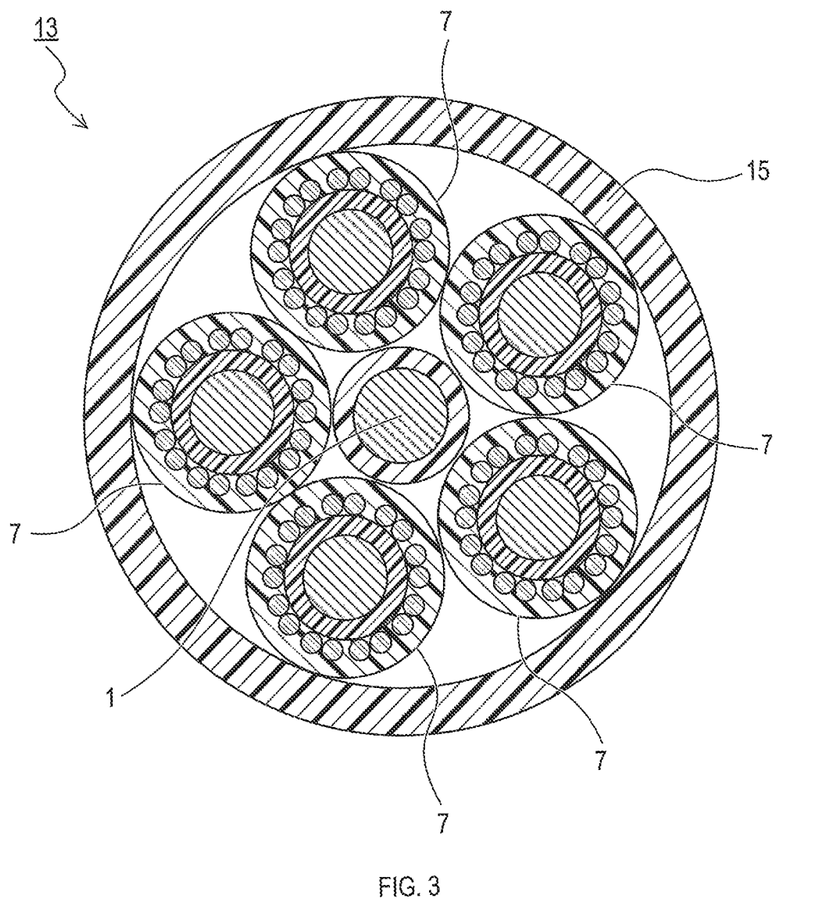
FIG. 3 is a sectional view showing a structure of a cable.

The cable has a structure shown in FIG. 3, for example. A cable 13 comprises the electrical wire 1, the coaxial electrical wires 7, and a sheath 15. The electrical wire 1 is identical to the one shown in FIG. 1. The coaxial electrical wires 7 are identical to the one shown in FIG. 2. The sheath 15 contains the thermoplastic resin, the flame retardant, and the additive. The sheath 15 binds the electrical wire 1 and the coaxial electrical wires 7. The cable 13 may comprise either the electrical wire 1 or the coaxial electrical wires 7 only.

4. Method for Manufacturing Electrical Wire, Coaxial Electrical Wire, and Cable

The electrical wire described in the section "1. Structure of Electrical Wire" can be manufactured through the following method, for example. First, the metal conductor having a wire diameter of 0.20 mm or smaller undergoes extrusion coating with the UV-crosslinkable resin composition containing 80% by mass or more of the thermoplastic resin. As a result, the insulation comprising the UV-crosslinkable resin composition is formed on the outside of the metal conductor.

The melt flow rate (MFR) of the UV-crosslinkable resin composition is preferably 4 or more when the extrusion coating is performed at 190° C. This further reduces the tension force to be applied to the metal conductor in the extrusion coating, and thus reduces the possibility of breaks of the metal conductor in the extrusion coating, even if the wire diameter of the metal conductor is small. The MFR is defined in Japanese industrial standards (JIS) C6992-2.

Subsequently, while the temperature of the UV-crosslinkable resin composition is at a melting point or higher, the UV-crosslinkable resin composition is irradiated with UV rays. As a result, the UV-crosslinkable resin composition is crosslinked.

The UV rays can be emitted by, for example, a metal halide lamp, or an UV light emitting diode (LED). The UV rays are preferably emitted by various types of UV LEDs having different emission wavelengths. With such UV LEDs, products that are crosslinked to a stable degree can be more easily achieved since, even if a specific wavelength/specific wavelengths of UV rays is/are absorbed or blocked by the resin or the additive, the crosslinking progresses due to UV rays with another wavelength or with other wavelengths.

It is desirable that the UV rays emitted by each of the UV LEDs have a peak wavelength close to a wavelength to which the photoradical generator is reactive (to be referred to as reactive wavelength). Examples of the wavelength close to the reactive wavelength of the photoradical generator include 405 nm, 395 nm, 385 nm, 365 nm, 300 nm, and 285 nm. A first UV LED and a second UV LED, for example, may be used in combination. UV rays emitted from the first UV LED have a first peak wavelength close to the reactive wavelength of the photoradical generator. UV light emitted from the second UV LED has a second peak wavelength that is close to the reactive wavelength of the photoradical generator and that is different from the first wavelength.

Alternatively, it is possible to use, for example, UV LEDs that emit UV rays having peak wavelengths different from the reactive wavelength of the photoradical generator.

The metal halide lamp is also called an electric discharge tube. The metal halide lamp may be with or without electrodes. The peak wavelength of the metal halide lamp during emission is preferably a wavelength suitable for the photoradical generator. The metal halide lamp may be configured such that a specific element/specific elements is/are sealed between the electrodes so as to adjust the emission wavelength.

It is desirable that the UV-crosslinkable resin composition is heated after the extrusion coating. The heating may be performed before the UV irradiation and/or after the UV irradiation. Heating the UV-crosslinkable resin composition facilitates crosslinking of the UV-crosslinkable resin composition.

Figure 4:
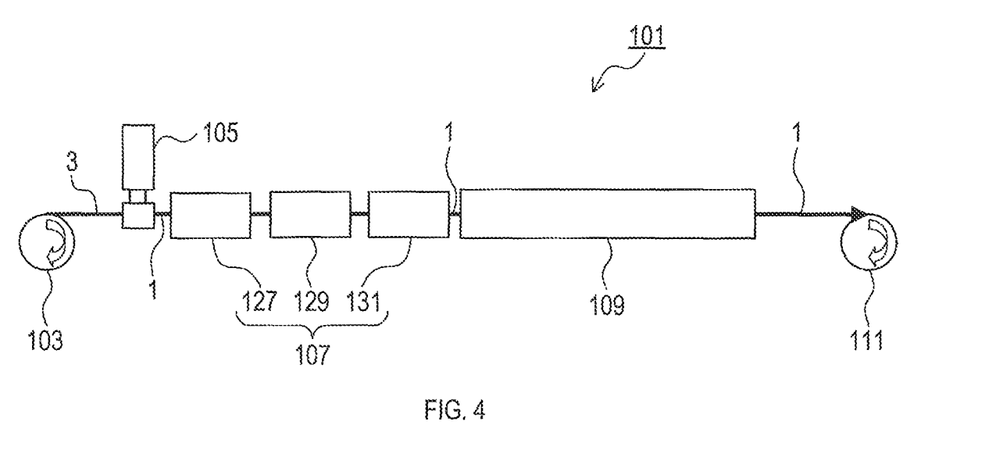
FIG. 4 is an explanatory diagram showing a structure of a manufacturing apparatus of an electrical wire.
Figure 5:
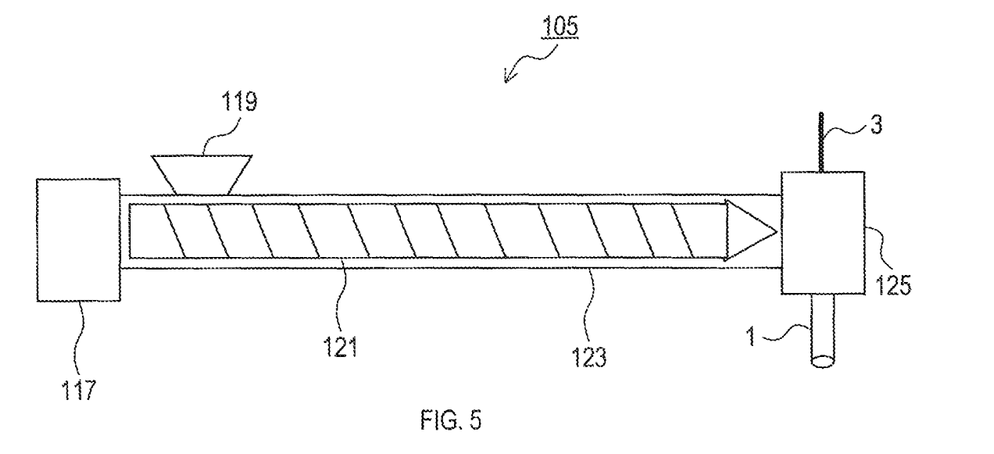
FIG. 5 is an explanatory diagram showing a structure of a molding device.

The above-described method for manufacturing an electrical wire can be carried out by, for example, a manufacturing apparatus 101 shown in FIGS. 4 and 5. As shown in FIG. 4, the manufacturing apparatus 101 comprises a feeder 103, a molding device 105, a crosslinking device 107, a cooling device 109, and a reel device 111.

The feeder 103 is configured to feed the metal conductor 3. The molding device 105 is configured to perform the extrusion coating on the fed metal conductor 3 with the UV-crosslinkable resin composition. Accordingly, the electrical wire 1, comprising the metal conductor 3 and the insulation layer 5, is formed.

The molding device 105 is an extruder. As shown in FIG. 5, the molding device 105 comprises a driving device 117, a resin feed aperture 119, a screw 121, a cylinder 123, and a molding head 125. The driving device 117 is configured to rotationally drive the screw 121. The UV-crosslinkable resin composition is fed into the cylinder 123 from the resin feed aperture 119. The fed UV-crosslinkable resin composition is melted, mixed, and kneaded by the rotating screw 121 as it advances inside the cylinder 123, and extruded from the molding head 125 so as to cover the metal conductor 3.

For example, the components of the UV-crosslinkable resin composition may be separately fed into the resin feed aperture 119. Alternatively, for example, the components of the UV-crosslinkable resin composition may be mixed and kneaded in advance by a mixer, a blender, a roller, and so on so as to be formed into pellets, and then may be fed into the resin feed aperture 119.

The crosslinking device 107 is configured to crosslink the insulation layer composed of the UV-crosslinkable resin composition. The crosslinking device 107 comprises a first heater 127, a UV irradiator 129, and a second heater 131. The electrical wire 1 is first heated by the first heater 127 at any given portion, then irradiated with the UV rays by the UV irradiator 129, and finally heated by the second heater 131.

The first heater 127 is configured to increase the temperature of the insulation layer to a temperature at which the UV crosslinking is more likely to occur. The second heater 131 is configured to maintain the temperature of the insulation layer so that the UV crosslinking continues even after the given portion of the electrical wire 1 has passed through the UV irradiator 129.

The UV irradiator 129 comprises, for example, the metal halide lamp, or the UV LED. The UV irradiator 129 comprises, for example, various types of UV LEDs having different emission wavelengths. The cooling device 109 is configured to cool the electrical wire 1 after the crosslinking so as to harden the insulation layer. The reel device 111 is configured to wind the cooled electrical wire 1. The cooling device 109 is, for example, a water-cooled type or an air-cooled type of cooling device. If there is no manufacturing problem, it is not necessary to provide the manufacturing apparatus 101 with the cooling device 109.

The coaxial electrical wire of the present disclosure can be manufactured, for example, by forming the external conductors and the sheath layer through a publically known method on the electrical wire manufactured in accordance with the above-described method. The cable of the present disclosure can be manufactured, for example, by binding the electrical wire and/or the coaxial electrical wires manufactured through the above-described method with the sheath through a publically known method.

5. Effects Achieved by Electrical Wire, Coaxial Electrical Wire, and Cable

The insulation layer of the electrical wire according to the present disclosure comprises the UV-crosslinkable resin composition. Since the UV-crosslinkable resin composition in the extruder is low in reactivity, premature crosslinking is less likely to occur in the extruder, and thus the viscosity of the UV-crosslinkable resin composition in the extruder is unlikely to change. Consequently, when the metal conductor undergoes the extrusion coating with the UV-crosslinkable resin composition, an excessive tension force is inhibited from being applied on the metal conductor, reducing the possibility of elongation and breaking of the metal conductor. This, therefore, facilitates manufacturing of the electrical wire, and also manufacturing of the coaxial electrical wire and the cable of the present disclosure each comprising the electrical wire of the present disclosure as a component.

The crosslinking in the UV-crosslinkable resin composition may not require use of a large device. Thus, an excessive tension force is unlikely to be applied to the metal conductor in the process of crosslinking, reducing the possibility of elongation and breaking of the metal conductor, which in turn facilitates manufacturing of the electrical wire. This also facilitates manufacturing of the coaxial electrical wire and the cable according to the present disclosure each comprising the electrical wire of the present disclosure as a component.

Moreover, the UV-crosslinkable resin composition is crosslinked by being irradiated with the UV rays. Accordingly, the electrical wire, the coaxial electrical wire, and the cable according to the present disclosure have high mechanical strength under high temperature.

6. Embodiments (6-1) Manufacturing of Electrical Wire

The raw materials listed in the rows "Composition" in Table 1 were mixed and kneaded by a kneader. As a result, pelleted resin compositions of Embodiments 1 to 4 and Comparative Examples 1 to 2 were obtained. The resin compositions of Embodiments 1 to 4 are the UV-crosslinkable resin composition.

TABLE 1

| | | | Comparative Example 1 | Comparative Example 2 | Embodiment 1 | Embodiment 2 | Embodiment 3 | Embodiment 4 |
|---|---|---|---|---|---|---|---|---|
| Composition | Polymer | 4040F (LLDPE) | 100 | 100 | 100 | 100 | | |
| | | F522 (LDPE) | | | | | 60 | 60 |
| | | TAFMER PN2030 | | | | | 40 | 40 |
| | Reactive Monomer | TAIC | 2 | 2 | 2 | 2 | 4 | 4 |
| | Photoradical Generator | Irg-TPO | | | 1.5 | 1.5 | 2 | 2 |
| | Organic Peroxide | DCP | | 0.05 | | | | |
| | Antioxidant | Phenolic Antioxidant | 0.5 | 0.5 | 0.5 | 0.5 | 1.0 | 1.0 |
| | | Phosphorous Antioxidant | 0.5 | 0.5 | 0.5 | 0.5 | 0.5 | 0.5 |
| | Temperature in Extrusion Operation (° C.) | | 190 | 190 | 190 | 190 | 210 | 210 |
| | MFR (g/10 min at 190° C., 2.16 kg) (JIS K7210) | | 4 | 4 | 4 | 4 | 9 | 9 |
| Manufacturing Conditions | Wire Diameter of Copper Conductor | mm (AWG) | 0.20 (32) | 0.20 (32) | 0.20 (32) | 0.13 (36) | 0.06 (42) | 0.04 (46) |
| | Crosslinking Method | Electron Beam Irradiation | ○ | | | | | |
| | | Organic Peroxide | | ○ | | | | |
| | | UV Irradiation | | | ○ | ○ | ○ | ○ |
| Results | Presence/Absence of Abnormality during Extrusion | | *1 | *2 | None | None | None | None |
| | Degree of Crosslinking (Xylene Extraction at 110° C. for 24 h) | | — | — | 75% | 75% | 80% | 82% |
| | Heat Deformation Test (121° C., 50%) | | — | — | Passed | Passed | Passed | Passed |

*1: Wire broke during electron beam irradiation
*2: Wire broke during extrusion

The raw materials listed in Table 1 are as follows.

4040F (LLDPE): linear low-density polyethylene (manufactured by Ube-Maruzen Polyethylene Co., Ltd., MFR 4.0 at 190° C.)

F522 (LDPE): low-density polyethylene (manufactured by Ube-Maruzen Polyethylene Co., Ltd., MFR 5.0 at 190° C.)

TAFMER PN2030: α-olefin copolymer (manufactured by Mitsui Chemicals, Inc., MFR 30 at 230° C.)

TAIC: triallyl isocyanurate

DCP: dicumyl peroxide

Note that 4040F (LLDPE), F522 (LDPE), and TAFMER PN2030 correspond to the thermoplastic resin, and DCP corresponds to a thermal radical generator.

In Embodiments 1 to 4, the UV-crosslinkable resin composition was fed into the resin feed aperture 119 of the manufacturing apparatus 101 shown in FIGS. 4 and 5. Then, copper conductor fed by the feeder 103 underwent the extrusion coating with the UV-crosslinkable resin composition so as to form the electrical wire. Moreover, the insulation layer of the electrical wire was crosslinked by the crosslinking device 107, and the electrical wire was cooled by the cooling device 109 and wound by the reel device 111.

The copper conductor corresponds to the metal conductor. The wire diameter of the copper conductor of each Embodiment was as shown in Table 1. Used as the molding device 105 was a 20 mm single screw extruder (L/D=25) manufactured by Ohmiya-Seiki Co., Ltd. The temperature in the extrusion operation was as shown in Table 1. The number of revolutions per minute in the extrusion coating was as follows: 25 rpm for the copper conductor with a wire diameter of 0.20 mm; 12 rpm for the copper conductor with a wire diameter of 0.13 mm; 6 rpm for the copper conductor with a wire diameter of 0.06 mm; and 4 rpm for the copper conductor with a wire diameter of 0.04 mm. Note that 0.20 mm corresponds to 32 American wire gauge (AWG), 0.13 mm corresponds to 36 AWG, 0.06 mm corresponds to 42 AWG, and 0.04 mm corresponds to 46 AWG.

The UV irradiator 129 was provided with two metal halide lamps. The two metal halide lamps were both high-pressure metal halide lamps (6 kW lamps in SMX series) manufactured by Orc Manufacturing Co., Ltd. One of the metal halide lamps emitted UV rays to the electrical wire from above, while the other emitted UV rays to the electrical wire from below.

In Comparative Example 1, basically the same manufacturing method was used as in Embodiments 1 to 4, but crosslinking was caused by irradiation of electron beams from an electron beam crosslinking device, instead of the crosslinking by the crosslinking device 107. In Comparative Example 2, basically the same manufacturing method was used as in Embodiments 1 to 4, but crosslinking was caused by the organic peroxide crosslinking instead of the crosslinking by the crosslinking device 107.

(6-2) Evaluation of Electrical Wire (i) Abnormalities in Extrusion Coating and Crosslinking It was checked whether there was any abnormality during the extrusion coating and the crosslinking. The results are shown in Table 1. In Embodiments 1 to 4, no abnormality occurred in the extrusion coating. It was because the UV-crosslinkable resin composition was only slightly prematurely crosslinked in the extruder, causing only small changes in the viscosity. Moreover, no abnormality occurred in the crosslinking in Embodiments 1 to 4. It was because use of a large electron beam crosslinking device was not required, and thus excessive tension force was not applied to the copper conductors in the process of crosslinking.

On the other hand, in Comparative Example 1, the copper conductor broke in the electron beam irradiation due to the tension force applied to the copper conductor in the large electron beam irradiation device was excessively large. In Comparative Example 2, the copper conductor broke in the extrusion coating due to the resin composition, containing the organic peroxide, being prematurely crosslinked in the extruder, which increased the viscosity of the resin composition and excessively increased the tension force applied to the copper conductor in the extrusion coating.

(ii) Degree of Crosslinking

The rates of crosslinking of the resin forming the insulation layer were evaluated in accordance with the xylene extraction method. Extract conditions in the xylene extraction method were to perform extraction at 110° C. for 24 hours. The degrees of crosslinking are shown in Table 1. The degrees of crosslinking in Embodiments 1 to 4 were 75% or more.

(iii) Heat Deformation Test

Heat deformation tests were run on the electrical wires at 121° C. in accordance with JIS C3005. The acceptability criterion was determined to be the deformation rate of less than 50%. The test results are shown in Table 1. The results show that the electrical wires of Embodiments 1 to 4 passed the tests.

7. Other Embodiments

The embodiments of the present disclosure are described hereinbefore. Nevertheless, the present disclosure is not limited to the above-described embodiments and may be embodied in various forms.

(1) Functions of one component in the aforementioned embodiments may be distributed to two or more components; one function of one component may be achieved by two or more components. Functions of two or more components may be achieved by one component; one function of two or more components may be achieved by one component. A part of the structures of the aforementioned embodiments may be omitted. At least a part of the structures of the aforementioned embodiments may be added to or replaced with other structures of another one of the aforementioned embodiments.

(2) In addition to the above-described electrical wire, coaxial electrical wire, and cable, the present disclosure can be embodied in various forms, such as a system comprising any one of the above-described electrical wire, coaxial electrical wire, and cable as a component, a method for manufacturing a coaxial electrical wire, a method for manufacturing a cable, and a method for crosslinking the insulation layer.

What is claimed is:

1. An electrical wire, comprising:
    a metal conductor with a wire diameter of 0.20 mm or smaller; and
    an insulation layer covering the metal conductor, the insulation layer being a non-coated extruded layer,
    wherein the metal conductor is a single wire, and
    wherein the insulation layer comprises an ultraviolet UV-crosslinkable resin composition containing 80% by mass or more of a thermoplastic resin,
    wherein a degree of crosslinking of the insulation layer m accordance with a xylene extraction method under an extract condition of 110° C. for 24 hours is 75% or more.

2. The electrical wire according to claim 1, wherein the UV-crosslinkable resin composition comprises, relative to 100 parts by mass of the thermoplastic resin:
    0.5 parts by mass or more and 5 parts by mass or less of a photoradical generator; and
    1 part by mass or more and 15 parts by mass or less of a reactive monomer.

3. A coaxial electrical wire comprising:
    an electrical wire according to claim 1;
    external conductors disposed on an outer circumference side of the insulation layer; and
    a sheath layer disposed on an outer circumference side of the external conductors.

4. A cable comprising:
   at least one electrical wire comprising a metal conductor with a wire diameter of 0.20 mm or smaller; and
   an insulation layer covering the metal conductor, the insulation layer being a non-coated extruded layer,
   wherein the metal conductor is a single wire, and
   wherein the insulation layer comprises an ultraviolet (UV)-crosslinkable resin composition containing 80% by mass or more of a thermoplastic resin, and/or
   at least one coaxial electrical wire according to claim 3; and
   a sheath comprising a thermoplastic resin, a flame retardant, and an additive, the sheath binding the at least one electrical wire and/or the at least one coaxial electrical wire.

5. The cable according to claim 4, wherein a degree of crosslinking of the insulation layer of the at least one electrical wire in accordance with a xylene extraction method under an extract condition of 110° C. for 24 hours is 75% or more.

6. The cable according to claim 4, wherein a deformation rate of the insulation layer of the at least one electrical wire by a heat deformation test at 121° C. in accordance with JIS C3005 is less than 50%.

7. The electrical wire according to claim 1, wherein the thermoplastic resin comprises one of polyethylene, polypropylene, polyvinyl chloride, polystyrene, polyvinyl acetate, polyurethane, polyamide, polycarbonate, polyester, and cyclic polyolefin.

8. The electrical wire according to claim 1, wherein the thermoplastic resin is consisted of linear low-density polyethylene (LLDPE).

9. The electrical wire according to claim 1, wherein the thermoplastic resin comprises low-density polyethylene (LDPE).

10. The electrical wire according to claim 1, wherein a deformation rate of the insulation layer by a heat deformation test at 121° C. in accordance with JIS C3005 is less than 50%.

11. A method for manufacturing an electrical wire comprising:
    coating, using extrusion coating, a metal conductor having a wire diameter of 0.20 mm or smaller with an ultraviolet (UV)-crosslinkable resin composition comprising 80% by mass or more of a thermoplastic resin; and
    UV irradiating the UV-crosslinkable resin composition while temperature of the UV-crosslinkable resin composition is at a melting point or higher,
    wherein a degree of crosslinking of the insulation layer m accordance with a xylene extraction method under an extract condition of 110° C. for 24 hours is 75% or more.

12. The method for manufacturing an electrical wire according to claim 11, wherein the UV irradiating is performed by a metal halide lamp or an UV light emitting diode (LED).

13. The method for manufacturing an electrical wire according to claim 12, wherein the UV irradiating is performed by the UV LED comprising various types of UV LEDs with different emission wavelengths.

14. The method for manufacturing an electrical wire according to claim 11, the method further comprising:
    heating the UV-crosslinkable resin composition is performed before the UV irradiation and/or after the UV irradiation.

15. The method for manufacturing an electrical wire according to claim 11, wherein a melt flow rate of the UV-crosslinkable resin composition while the extrusion coating is performed at 190° C. is 4 or more.

16. A method for manufacturing an electrical wire, the method comprising:
    feed a metal conductor from a feeder to a molding device;
    extrude, using the molding device, an insulating layer onto the metal conductor,
    wherein the extruded insulating layer is an ultraviolet (UV) crosslinkable resin composition including:
    a thermoplastic resin,
    a reactive monomer, and
    a photoradical generator;
    heat, in a first heater, the extruded insulating layer;
    UV irradiate the heated extruded insulating layer, such that the heated extruded insulating layer is partially crosslinked;
    further heat, in a second heater, the partially crosslinked insulating layer, such that additional crosslinking occurs; and
    cool the additionally crosslinked insulating layer,
    wherein a degree of crosslinking of the insulation layer m accordance with a xylene extraction method under an extract condition of 110° C. for 24 hours is 75% or more.

17. The method of claim 16, further comprising:
    reel the electrical wire, including the cooled additionally crosslinked insulating layer, into a reel device.

18. The method of claim 17, wherein the molding device includes:
    a driving device;
    a resin feed aperture;
    a cylinder in communication with the resin feed aperture;
    a screw located substantially in the cylinder; and
    a molding head.

19. The method of claim 18, wherein a diameter of the metal conductor is not more than 0.2 mm, and
    wherein the UV crosslinkable resin composition includes:
    the thermoplastic resin, in a first proportion of at least 80% by weight, based on a weight of the UV crosslinkable resin composition;
    the reactive monomer, in a second proportion of at least 1% and not more than 30% by weight, based on a weight of the thermoplastic resin; and
    a photoradical generator, in a third proportion of at least 0.5% and not more than 10% by weight, based on the weight of the thermoplastic resin.

* * * * *